United States Patent Office 3,535,106
Patented Oct. 20, 1970

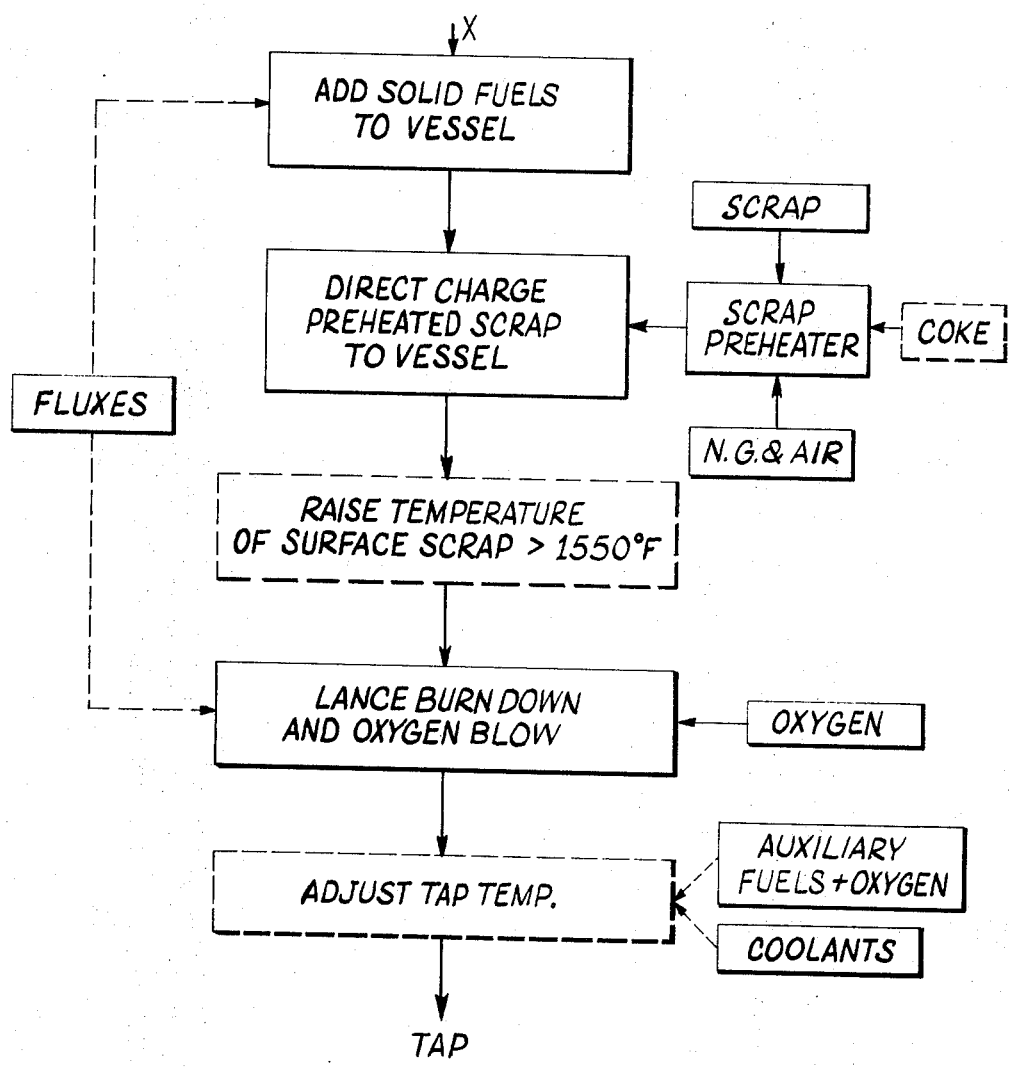

3,535,106
100% SOLID CHARGE BASIC OXYGEN PROCESS
John C. D'Entremont and Charles R. Taylor, Middletown, Ohio, assignors to Armco Steel Corporation, Middletown, Ohio, a corporation of Ohio
Filed Oct. 11, 1967, Ser. No. 674,444
Int. Cl. C21c 5/28
U.S. Cl. 75—43                                  10 Claims

ABSTRACT OF THE DISCLOSURE

This invention relates to the basic oxygen steel making process. More particularly, the L–D Process which utilizes a 100% solid metal charge. Economies are realized in this process by externally heating the solid charge to an average temperature below the point at which the solid charge begins to fuse, transferring the preheated charge to an open topped converter vessel containing a quantity of solid fuels, raising the surface scrap to the oxygen ignition temperature, and directing oxygen against the solid fuels to melt and refine the charge.

DEVELOPMENT OF THE INVENTION

The constant demand for new and better steels at lower costs has been a primary force in the development of improved methods in the manufacture of steel. However, practical as well as metallurgical considerations presented certain obstacles to improving the economics of steel making.

One of the earliest methods for producing steel was the Bessemer converter. Liquid iron was poured into the converter and air was blown through the bottom of the converter. The result was a large loss of metal. Further, due to the inherently high nitrogen contents in Bessemer steels, and the inability to accurately control the chemistry of the steel, the process soon gave way to other processes.

The open-hearth process then emerged and has gained such wide acceptance in the United States that today nearly 70% of the domestic steel production is by this process. A major reason for this success was due in part to the ease in controlling chemistry. The process is relatively versatile in that it utilizes any combination of molten iron, scrap and pig iron. That is, the charge may be either totally solid, or a combination of solid and liquid. But in any case, in today's modern open-hearth practice, many hours are required to melt and refine a quantity of steel before tapping.

In 1954, a revolutionary development took place in the steel industry. The Bessemer process was drastically modified by what the industry now calls the Basic Oxygen Process or the L–D Process. In this process, a charge of blast furnace hot metal and up to 30% scrap is placed in the converter or open-topped vessel and a stream of substantially pure oxygen is directed against the surface of the charge. This effects the conversion reactions necessary to produce steel. Generally, molten metal comprises the major portion of the charge; that is, on the order of 70%. Proposals have been brought forth to increase the quantity of solid charge. None, however, have been directed to an economic way of utilizing a 100% solid charge.

Progress in the steel industry requires adaptability. To restrict the L–D process to only those facilities capable of providing a molten metal charge would be to hamper progress. Up to the present development, the L–D Process was so limited; however, with the invention as taught herein, the restrictions have been removed.

Accordingly, it is a principal object of this invention to increase the flexibility of the basic oxygen steel making process by permitting the use of a 100% solid charge in an economic manner.

BRIEF SUMMARY OF THE INVENTION

In the preferred practice of this invention, a quantity of iron and steel such as the plant revert scrap, pig iron, and/or other purchased scrap is charged into a preheat vessel. The preheat vessel is generally a refractory lined container having an open top for charging and a hinged bottom for discharging the preheated scrap.

Briefly, in a typical system, a quantity of scrap metal is heated in a refractory lined vessel by means of flames from burners extending through the top of said vessel. Through a unique arrangement of the vessel, a positive pressure is established therein causing the products of combustion to pass downwardly through the scrap metal and exit through restricted openings disposed at the bottom. A further feature of said co-pending application is the additional step whereby oxidation of the scrap metal is minimized.

Coincident with preheating of the solid scrap, a quantity of solid oxidizable fuels such as coal, coke, petroleum coke, ferrosilicon, silicon carbide, calcium carbide, and the like, are deposited in the bottom of an open topped converter vessel. In the case of coke, additions of about 90–180 lbs. per ton of charge are necessary to effect the conversion. Other fuels, such as those noted above, may be substituted for a portion of the coke in quantities which are in an inverse ratio to their fuel values as compared to coke. Such values are known and readily available to those skilled in the art.

The preheated scrap metal is now charged on top of the selected solid fuels in the converter. Since it is advisable to minimize the heat loss from the transfer of the preheated scrap, the particular opened top converter vessel will also be in a preheated condition. Auxiliary preheating of the converter vessel is generally unnecessary, for in a continuous on line operation the vessel will retain sufficient temperature.

At this juncture, a stream of high pressure oxygen is now applied to the scrap metal. To insure the ignition of the surface charge when starting the lancing operation in accordance with the L–D Process, the surface scrap should be raised, when necessary, to a temperature of at least 1550° F. This form of preheating can be effected through oxy-fuel burners, or powdered fuels applied to the surface of the scrap. As soon as ignition is achieved, the oxygen lance, through which the oxygen is applied, is rapidly burned down through the scrap to a position just above the quantity of solid fuels. The fuel is ignited and caused to burn with the result that the thermal energy from the burning fuel melts the solid scrap metal. That is, the direct oxidation of these solid fuels provide sufficient thermal energy to cause melting of the solid scrap, plus the fluxing of the slag additives.

The specific selection of the various fuels is generally a combination of the fuels listed above. A primary fuel such as coal, coke, petroleum coke or the like, is used to the extent of about 150 lbs. per ton of charge. A secondary fuel such as the ferrosilicon, silicon carbide, and calcium carbide is used as the balance of the fuel additive. Secondary fuels, as used herein, are intended to include those solid fuels having high exothermic values. This covers non-carbonaceous and synthetic carbonaceous fuels; two of the latter were noted above. There is some latitude in selecting the quantity of fuels as it is generally desirable to minimize the sulfur addition to the charge. Sulfur additions are generally associated with the carbonaceous fuels of the fossil fuel types, such as coal, coke, petroleum coke and the like. Further, if a high carbon pig iron or cast scrap is used, less carbonaceous fuel is needed to insure the proper oxidation reactions. On the other hand, if larger quantities of the secondary or auxiliary fuels are used, the cost of materials and maintenance increases. Thus, it should be apparent that the economic conditions of the locale is a major concern in selecting the quantity and types of fuels.

The oxygen blow is continued for a period of time to insure the initiation of the melting process. Where low sulfur values are desired and large quantities of the primary fuels are used, it has been discovered that by delaying the addition of at least a portion of the fluxes until later in the melting cycle rather than with the initial fuel charge, lower sulfur recoveries in the molten steel can be realized. For example, the oxygen blow can be interrupted on the order of about ten minutes after the oxygen is started and the final fluxing agents are added. The oxygen is then continued until such time as the fuels are exhausted and the desired chemistry has been reached. However, where the sulfur input is low, or where the raw materials contain a minimum of sulfur, it is preferred to continue the oxygen blow uninterrupted.

At the conclusion of the oxygen blow, the molten steel is sampled and adjusted to the proper tapping temperature. If it is determined that the temperature is too low, additional auxiliary fuels may be added to the vessel. On the other hand, if it is desirable to cool the steel prior to tapping, a quantity of solid scrap such as cast or pig iron, crops, or speigel may be added to the bath. At such time as the temperature reaches the required tap temperature, the steel is tapped.

In the following the foregoing procedure, an average metallic yield of over 90% is readily obtainable. Further, the fuming loss associated with the oxygen blow was observed to be less than the modified open-hearth using oxygen lances, and far less than the conventional molten metal B.O.P.

DETAILED DESCRIPTION

The preferred embodiment of this invention is illustrated schematically by the flow chart representation in the figure. One of the initial steps in the practice of this invention (depicted at the right of the figure) is the selection and heating of a charge consisting solely of solid iron and steel scrap. Such a charge is placed in a refractory lined vessel which doubles as a pre-heat container and a delivery chute for the preheated scrap. The preheating is accomplished by the combustion of natural gas and air. While it should be apparent that certain variations may exist in the particular combination of gas delivery rates, pre-heat times, and charge sizes, large variations from the preferred have been found to be unacceptable. For example, excessively high gas rates for a short period of time may cause incipient fusion and sticking at the top of the charge. On the other hand, low gas rates for a prolonged time may result in a large variation in temperature within the solid charge. Further, excessive oxidation of the charge can occur unless combustion is controlled by using stoichiometric ratio or less of air to gas for the preheating step.

While attempting to minimize oxidation, the most efficient operation is achieved when the solid charge is heated to the highest possible temperature. However, this temperature should lie short of the temperature at which fusion of the solid charge takes place. In other words, it is essential to maintain the solid charge into discrete pieces to insure a minimum of problems during the transfer from the preheating vessel to the melting vessel. While it may occur to one skilled in the art that further economies are possible by eliminating said transfer of material, i.e., reheating and melting in a single vessel, such is not the case. Accordingly, the operations take place in separate vessels.

Simultaneously with the preheating, a hot basic oxygen process converter (hereinafter referred to as converter), an open topped refractory lined vessel known and used extensively in the steel industry, is charged with approximately 90–180 lbs. of carbonaceous solid fuel per ton of charge. It should be apparent to those skilled in the art that the initial heating of the converter is the result of a prior molten charge therein. That is, under normal conditions of a continuous on-line operation, the previous charge will cause the vessel to retain sufficient heat for the succeeding charge. The operations occurring within the converter are illustrated down the center of the figure.

The carbonaceous fuels referred to above may be supplemented by the addition of such oxidizable fuels as ferrosilicon, silicon carbide, and calcium carbide. The quantities employed are on the order of 10–30 lbs. per ton of solid charge. Since, as noted above, the thermal energy from the combusion of the fuels melts the solid charge, these oxidizable fuels having a relatively high thermal energy value are beneficial in securing a fast melting of the solid charge. These auxiliary fuels further aid in providing needed elements such as silicon and carbon to the bath. However, such fuels are not without their limitations. The fuels are considerably more expensive than the carbonaceous fuels and the large use of same may adversely affect the lining of the converter. Accordingly, these auxiliary fuels are only used to the extent necessary to reduce the sulfur burden in the charge, and then only to the extent of about 10–30 lbs. per ton of solid charge. As indicated earlier, the selection of fuels will be dictated primarily by the economics and locale of the operation. For example, if a low sulfur bearing coal or coke can be used, the secondary fuels may be eliminated. However, where the carbonaceous fuels contain a high percentage of sulfur, the secondary fuels may be required depending on desired final percent sulfur.

At this stage of the operation, the hot solid scrap material is charged into the converter from the pre-heat vessel. This is accomplished in a minimum of time to insure against fusion of the parts as well as to conserve the heat in the solid charge. Since it is virtually impossible to position the hottest scrap when charging same to the converter, it may be necessary to heat the surface of the charge further in the converter to a temperature whereby ignition with the oxygen lance is assured.

When the surface scrap has reached a temperature of at least 1550° F., oxygen is applied at the rate of about 3,000–6,000 s.c.f./hr./ton charge. As soon as ignition is obtained, the oxygen lance is quickly lowered to within several feet of the converter bottom wherein the solid fuels lie. This latter operation may be defined as the lance burndown. The rapidity of the lance burndown has a dual effect on the entire operation. By minimizing the time in which this lance is required to reach the solid fuels, the chance of excessive scrap oxidation is lowered. Further, by accomplishing this as rapidly as possible, a small hole is formed in the scrap which insures that the hot gases from the burning fuels are forced through the remaining scrap, thereby conserving the heat for melting purposes. That is, there is avoided a flue effect with an attendant loss of heat.

The oxygen blow or lancing is continued for about eight to fifteen minutes to initiate the melting of some of the solid charge. At this time, additional fluxes such as fluorspar and lime may be charged into the converter to assist in making a working slag, if the complete quantity of slag making constituents was not added as part of the initial charge. Contrary to what has been taught by the prior art, this delay in adding the final fluxes has shown that lower sulfur steels can be produced over processes where all the flux additions are made entirely at the beginning of the oxygen blow. Heretofore, it was felt that the acidic condition of a high FeO slag would adversely affect the refractory lining of the vessel. However, in the present invention, the initial high FeO slag is relatively "cold" and does not adversely affect the converter lining. This is due to the fact that so long as a portion of the charge is unmelted, the temperature of the molten metal and slag will not rise above approximately the melting temperature of iron and steel. Thus, sulfur is given an opportunity to pass from the bath as a gas. The lime additions tie up additional sulfur plus making what is termed a "working" slag.

Following the addition of the fluxes, the oxygen blow is continued until exhaustion of the solid fuels. This time should be sufficient to provide for the melting of the solid charge, refining the molten metal, and superheating of the latter to the tapping temperature. The oxygen blow is not continued beyond the exhaustion of the solid fuels, so as to avoid unnecessary oxidation of the charge.

It should be understood that the refining operation is a continuing operation and not one subsequent to the melting. That is, the refining begins as soon as the solid charge begins to melt. It has been found that with the use of high carbon pig or cast scrap, and/or the carbonaceous fuels, carbon will be dissolved in the molten steel. This will be burned out by the oxygen during the so-called carbon boil. This permits the slag/metal refining reactions and further provides for the elimination of nitrogen.

It has also been observed that during the melting and refining operation, the volume of slag that develops is about twice that of a normal molten metal B.O.P. This is primarily from the coke ash plus the formation of a highly basic slag, on the order of the basicity ratio of about 4.5:1. This high slag volume also has a direct effect on lowering the sulfur of the molten metal bath.

At the exhaustion of the solid fuels, the temperature of the bath is adjusted to tapping temperature. If it is determined that the bath is too hot, it may be cooled by the addition of cast or pig iron, crops, or speigel. Since it is necessary to uniformly reduce the temperature of the bath, a carbon bearing material must be used to insure that a carbon boil is present to cause a mixing of the bath and not merely a heating of the slag. On the other hand, if the temperature is insufficient, additional fuels such as ferrosilicon may be used. At such time as the proper temperature is reached, the steel may be tapped.

The following is illustrated as exemplary of the foregoing process and the economies realized thereby.

EXAMPLE I

In the following example, the sulfur specification was a maximum .050 weight percent sulfur. With this limit, approximately 49,300 lbs. of assorted scrap was preheated to an average temperature of 1515° F., this being the logarithmic mean between the measured top and bottom temperature in the scrap preheater. This temperature was achieved by the use of 956 s.c.f. natural gas per ton of scrap. Concurrently with the preheating, about 3900 lbs. of coke and 1400 lbs. of lime were charged to the converter vessel. As soon as the preheated scrap reached the indicated temperature, said scrap was charged directly from the preheat vessel to the converter vessel. To insure the ignition of the oxygen, an oxy-gas burner having a rated capacity of 100 million B.t.u.'s per hour was directed against the surface scrap for a duration of about 3 minutes. An oxygen lance blowing 104,000 s.c.f. oxygen per hour was directed against the heated surface whereby scrap ignition with the oxygen was obtained. The oxygen lance was then immediately lowered to a position in which the oxygen impingement was directly against the coke. About 12 minutes after the start of the oxygen blow, the fluxing additions were completed. At this time, about 1,000 lbs. of lime and 100 lbs. of fluorspar were added to the converter vessel. The oxygen blow was then restarted and continued for an additional 29 minutes. The total oxygen expenditure up to this time being approximately 71,300 s.c.f. At this time, the temperature was approximately 2,840° F., and the sulfur content was 0.040 weight percent. The temperature of the bath was then adjusted by the addition of 140 lbs. of (50%) FeSi and the oxygen restarted for a duration of about 1½ minutes at a blow rate of 100,000 s.c.f. per hour. This action was sufficient to raise the temperature of the bath to about 2940° F., whereupon it was tapped. The final sulfur content was found to be .036 weight percent.

EXAMPLE II

Here, the specification called for a maximum of .025 weight percent sulfur. To achieve this specified maximum, approximately 49,800 lbs. of assorted scrap were preheated to an average temperature of about 1630° F. This temperature was calculated on the same basis as the average temperature in the preceding example. At the conclusion of the preheating step, the hot scrap was charged to a converter vessel containing approximately 3,400 lbs. of coke, 1,400 lbs. of lime, 100 lbs. of sand, and 500 lbs. of calcium carbide. The surface scrap was then preheated for approximately 3 minutes followed by the oxygen lance. The oxygen lance was quickly lowered to a position impinging upon the coke; the oxygen blowing at the rate of 100,000 s.c.f. oxygen per hour. The oxygen blow was stopped after about 8 minutes for the flux additions; namely, 1,000 lbs. lime, 200 lbs. sand, and 100 lbs. fluorspar. The oxygen blow was then resumed for 34 minutes at the rate of 100,000 s.c.f. oxygen per hour. At the completion of the oxygen blow the temperature read 2,800° F., and the sulfur content was found to be .031 weight percent. At this point, 200 lbs. of (50%) FeSi were added to the vessel and the oxygen blow restarted for a duration of 2 minutes at 100,000 s.c.f. oxygen per hour. At the conclusion of this brief oxygen blow the temperature was again checked and found to be 2,925° F., sufficient for tapping. An analysis of the steel revealed a sulfur content of 0.019 weight percent.

From the foregoing, it should be apparent that by this procedure, it is possible to produce basic oxygen steels through the controlled use of solid fuels and fluxing agents. Further, low sulfur recoveries are possible when following the procedure outlined above.

It is believed that modifications may be made in the process, particularly to those skilled in the art, without departing from the spirit and scope of the invention. Accordingly, it is not intended that the invention be in any way limited except as set forth in the appended claims.

The embodiments of the invention in which an exclusive property or privilege is claimed are defined as follows:

1. In a method for producing steel according to the basic oxygen process, the improvement comprising in combination therewith the steps of selecting a charge consisting of solid metallic iron and steel, preheating said charge to an elevated temperature without excessive oxidation thereof, sequentially adding:
   (a) a sufficient quantity of oxidizable solid fuels and fluxes to melt and refine said solid charge, and
   (b) said preheated charge into an open topped converter vessel, directing a stream of oxygen against said solid charged materials, rapidly melting a hole in said preheated charge so as to effect contact between said oxygen and said solid fuel, igniting the solid fuel to effect the melting of said solid metallic charge, terminating the oxygen stream when the charged solid fuels have been exhausted, adjusting the temperature of the molten bath to a suitable tapping temperature, and pouring said molten steel from said converter.

2. The method claimed in claim 1 wherein said preheating of the solid charge is to a temperature below the temperature of incipient fusion of said charge.

3. The method claimed in claim 1 wherein a major portion of said oxidizable solid fuels in a carbonaceous fuel selected from the group consisting of coke, coal, and petroleum coke.

4. The method claimed in claim 3 wherein a portion of said carbonaceous fuel is replaced by another oxidizable solid fuel in an amount calculated on the inverse ratio to the fuel values as compared to said carbonaceous fuel.

5. The method claimed in claim 4 wherein said oxidizable solid fuel is a material selected from the group consisting of ferro-silicon, calcium carbide, and silicon carbide.

6. The method claimed in claim 3 including the step of charging a portion of the total flux addition with said oxidizable solid fuels.

7. The method claimed in claim 6 wherein said oxygen stream is prematurely interrupted and the remaining portion of fluxes is added to the melted charge.

8. The method claimed in claim 7 wherein said interruption occurs during the period from 8 to 15 minutes after the ignition of the solid fuels.

9. The method claimed in claim 3 including the step of heating the surface scrap of the preheated solid metallic charge in said converter to a temperature in excess of 1550° F.

10. The method claimed in claim 3 wherein direct contact between said stream of oxygen and said solid metallic charge is minimized by the rapid burndown with oxygen prior to igniting said oxidizable solid fuels.

References Cited

UNITED STATES PATENTS

| | | | |
|---|---|---|---|
| 51,401 | 12/1865 | Bessemer | 75—43 X |
| 2,800,631 | 7/1957 | Suess et al. | 75—60 |
| 3,174,847 | 3/1965 | Dagan | 75—43 |
| 3,223,521 | 12/1965 | Stone | 75—60 X |
| 3,232,748 | 2/1966 | Rinesch | 75—60 |
| 3,234,011 | 2/1966 | Rinesch | 75—60 |
| 3,301,662 | 1/1967 | Ban | 75—60 X |

FOREIGN PATENTS

| | | |
|---|---|---|
| 704,031 | 2/1965 | Canada. |
| 994,395 | 6/1965 | Great Britain. |

L. DEWAYNE RUTLEDGE, Primary Examiner

G. K. WHITE, Assistant Examiner

U.S. Cl. X.R.

75—60